(12) United States Patent
Ohashi et al.

(10) Patent No.: US 7,427,056 B2
(45) Date of Patent: Sep. 23, 2008

(54) MIXER FOR ENGINE, AIR CONDITIONING APPARATUS DRIVEN BY ENGINE, AND POWER GENERATION APPARATUS DRIVEN BY ENGINE

(75) Inventors: Yasuhito Ohashi, Anjo (JP); Kazufumi Kitamura, Toyota (JP); Takashi Masuda, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 338 days.

(21) Appl. No.: 11/396,467

(22) Filed: Apr. 4, 2006

(65) Prior Publication Data

US 2006/0225715 A1    Oct. 12, 2006

(30) Foreign Application Priority Data

Apr. 8, 2005  (JP)  ............... 2005-112530

(51) Int. Cl.
*F02M 9/02*    (2006.01)
(52) U.S. Cl. ............... 261/44.6; 123/590; 261/44.8; 261/66; 261/DIG. 23
(58) Field of Classification Search ....... 261/44.6–44.8, 261/66, DIG. 23; 123/590
See application file for complete search history.

(56) References Cited

U.S. PATENT DOCUMENTS

| | | | | |
|---|---|---|---|---|
| 1,737,496 A | * | 11/1929 | Feroldi ............... 261/44.8 |
| 1,961,775 A | * | 6/1934 | Mills ............... 123/198 DB |
| 1,971,527 A | * | 8/1934 | Kennedy ............... 261/44.2 |
| 2,033,220 A | * | 3/1936 | Aseltine ............... 261/39.3 |
| 2,087,293 A | * | 7/1937 | Olson ............... 261/66 |
| 2,125,886 A | * | 8/1938 | Chandler ............... 261/41.1 |
| 2,273,979 A | * | 2/1942 | Mock ............... 261/1 |
| 2,995,349 A | * | 8/1961 | Kennedy, Sr. ............... 261/41.1 |
| 3,093,699 A | * | 6/1963 | Demitz ............... 261/65 |
| 4,175,102 A | * | 11/1979 | Greiner et al. ............... 261/50.2 |
| 4,229,387 A | * | 10/1980 | Rogerson et al. ............... 261/66 |
| 4,442,047 A | * | 4/1984 | Johnson ............... 261/66 |
| 4,498,439 A | * | 2/1985 | Franchini et al. ............... 123/438 |
| 4,505,863 A | * | 3/1985 | Smith ............... 261/34.2 |
| 4,783,286 A | * | 11/1988 | Lee ............... 261/23.25 |
| 2002/0148419 A1 | * | 10/2002 | Hironaka et al. ............... 123/73 A |
| 2006/0225715 A1 | * | 10/2006 | Ohashi et al. ............... 123/590 |

FOREIGN PATENT DOCUMENTS

JP    63-88257 A    *  4/1988  ............... 261/44.6
JP    8-2460         1/1996

* cited by examiner

*Primary Examiner*—Richard L Chiesa
(74) *Attorney, Agent, or Firm*—Oblon, Spivak, McClelland, Maier & Neustadt, P.C.

(57) ABSTRACT

A mixer for an engine includes a base portion having an intake passage in which the air flows, a fuel passage in which the fuel flows, and a mixing space in which the fuel and the air are mixed, and an axial hole which communicates with the mixing space, a first valve having an axial portion fitted in the axial hole of the base portion and rotatable in a circumferential direction of the axial portion, a center hole which is provided in the axial portion and communicates with the axial hole, and a first opening which is provided at the axial portion and communicates with the center hole, the first opening communicable with the fuel passage, and a first drive portion for rotating the first valve in a circumferential direction thereof relative to the axial hole for changing a communicating area of the first opening with the fuel passage.

20 Claims, 10 Drawing Sheets

MIXER FOR ENGINE, AIR CONDITIONING APPARATUS DRIVEN BY ENGINE, AND POWER GENERATION APPARATUS DRIVEN BY ENGINE

CROSS REFERENCE TO RELATED APPLICATIONS

This application is based on and claims priority under 35 U.S.C. § 119 to Japanese Patent Application 2005-112530, filed on Apr. 8, 2005, the entire content of which is incorporated herein by reference.

FIELD OF THE INVENTION

This invention generally relates to a mixer for an engine, an air conditioning apparatus driven by an engine, and a power generation apparatus driven by an engine.

BACKGROUND

A conventional mixer for an engine for mixing a fuel and air supplied to an engine is described in Japanese Utility Model publication JPH08 (1996)-002460Y2 (document 1). The mixer includes a base portion including an intake passage in which air flows, a fuel passage in which a fuel flows, and a mixing space in which the fuel flowing from the fuel passage and the air flowing from the intake passage are mixed, a fuel control valve which is provided so as to face a valve opening of the base portion and which is a needle-shape, and a drive portion for moving the fuel control valve in an axial direction. According to the document 1, as illustrated in FIG. 15, when the fuel control valve 700 of a needle shape moves in the axial direction MA thereof, a passage area of the valve opening 800 changes and a degree of opening of the fuel control valve 700 changes.

Figure 15:
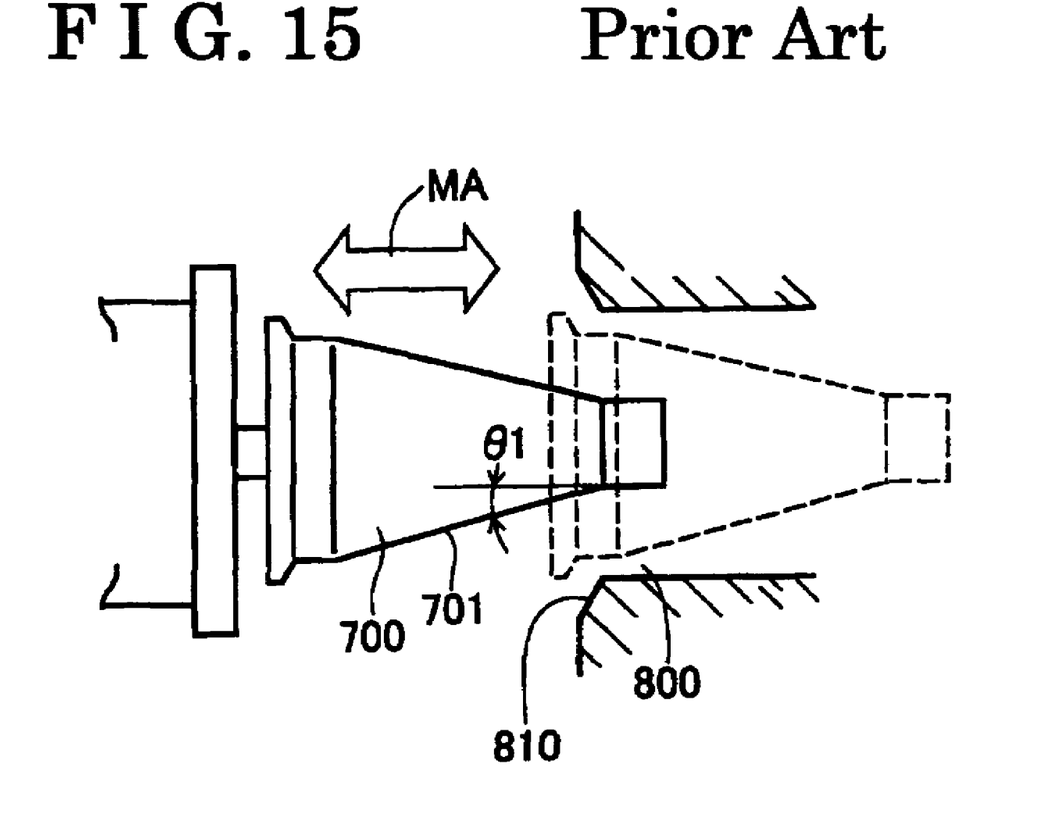
FIG. 15 represents a schematic view illustrating a fuel control valve of a direct acting type according to a conventional technique.

According to the document 1, as illustrated in FIG. 15, a configuration is employed in which the passage area of the valve opening 800 changes when the fuel control valve 700 of the needle shape moves in the axial direction thereof (direction of the arrow MA). Accordingly, for finely adjusting a flow rate of the fuel and increasing a fuel controllability, a degree θ1 of a cone surface 701 of the fuel control valve 700 of the needle shape needs to be small and a distance of direct motion of the fuel control valve 700 of the needle shape needs to increase. However, in this case, the mixer would be upsized in the axial direction (direction of the arrow MA) of the fuel control valve 700 of the needle shape.

Further, in the mixer for an engine, there can be a danger that an end portion of the fuel control valve 700 of the needle shape contacts with a valve seat 810 because of vibrations of the engine. There can be a danger that this can cause a change of performance or formation of scratches. Accordingly, the fuel control valve 700 of the needle shape is designed so that the end portion of the fuel control valve 700 of the needle shape does not contact with the valve seat 810 of the valve opening 800 of the base portion when the degree of opening of the fuel control valve 700 is set to minimum. Accordingly, complete closing operation is difficult for the fuel control valve 700. As a result, fuel controllability was not always sufficient in a situation of a small degree of opening. Further, in a situation where a maximum passage area of the valve opening 800 is set by moving the fuel control valve 700 of the needle shape in a direction in which the fuel control valve opens, for ensuring a passage area at the maximum degree of opening of the fuel control valve 700, a diameter of the valve seat 810 needs to be upsized. In this case, though a passage area of the valve opening 800 can be ensured at the maximum degree of opening of the fuel control valve 700, a passage area of the valve opening 800 would be large at the minimum degree of opening of the fuel control valve 700. In this term also, fuel controllability in a situation of a small degree of opening of the fuel control valve 700 was not sufficient.

A need thus exists for a mixer for an engine, an air conditioning apparatus driven by an engine, and a power generation apparatus driven by an engine, which are downsized and advantageous for increasing fuel controllability and which can ensure fuel controllability at a small degree of opening of a valve. The present invention has been made in view of the above circumstances and provides such a mixer for an engine, an air conditioning apparatus driven by an engine, and a power generation apparatus driven by an engine.

SUMMARY OF THE INVENTION

According to an aspect of the present invention, a mixer for an engine for mixing a fuel and air supplied to the engine includes a base portion having an intake passage in which the air flows, a fuel passage in which the fuel flows, a mixing space in which the fuel flowing from the fuel passage and the air flowing from the intake passage are mixed, and an axial hole which has a cylindrical shape and communicates with the mixing space, a first valve having an axial portion fitted in the axial hole of the base portion and rotatable in a circumferential direction of the axial portion, a center hole which is provided in the axial portion and communicates with the axial hole, and a first opening which is provided at the axial portion and communicates with the center hole, the first opening communicable with the fuel passage, and a first drive portion for rotating the first valve in a circumferential direction thereof relative to the axial hole for changing a communicating area of the first opening of the first valve with the fuel passage as the first valve is rotated in the circumferential direction thereof.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention will be explained. A mixer for an engine for mixing a fuel and air supplied to an engine includes a base portion having an intake passage in which air flows, a fuel passage in which a fuel flows, a mixing space in which the fuel flowing from the fuel passage and the air flowing from the intake passage are mixed, and an axial hole of a cylindrical shape, a fuel control valve (first valve) having an axial portion fitted in the axial hole of the base portion rotatably in a circumferential direction and a first opening which is provided at the axial portion and which can face the fuel passage to communicate with the fuel passage, and a first drive portion for rotating the fuel control valve in the circumferential direction relatively to the axial hole for changing a communicating area of the first opening with the fuel passage as the fuel control valve is rotated in the circumferential direction.

As described above, the fuel control valve includes the axial portion fitted in the axial hole of the base portion rotatably in the circumferential direction and the first opening which is provided in the axial portion and which can face the fuel passage. Then, the first drive portion rotates the fuel control valve in the circumferential direction relatively to the axial hole. As the fuel control valve is rotated in the circumferential direction, the communicating area of the first opening of the fuel control valve with the fuel passage can be changed.

In this embodiment, the fuel control valve is rotated in the circumferential direction. In this type of valve, increase of a length of the first opening of the fuel control valve in the circumferential direction of the axial portion of the fuel control valve can enhance fuel controllability. In this case, a circumferential length of the axial portion of the fuel control valve can be basically given by D×3.14, where D is a diameter of the axial portion of the fuel control valve. Accordingly, this type of the fuel control valve, in which the fuel control valve is rotated in the circumferential direction, is advantageous for downsizing the fuel control valve in an axial length and at the same time for increasing a length of the first opening of the fuel control valve. As a result, a downsized fuel control valve having increased fuel controllability can be expected.

According to the embodiment, an increase of a width of the first opening of the fuel control valve from a minimum width of the first opening can be set equal to or less than 10%, or, equal to or less than 5% in the circumferential direction of the fuel control valve. Thus, change of the width of the first opening is restricted. Accordingly, the first opening can be linearly formed so as to extend in the circumferential direction of the fuel control valve.

According to the embodiment, the width of the first opening can be set, for example, to change continuously or stepwise in the circumferential direction of the fuel control valve. In this case, the width of the first opening can be set to increase continuously or stepwise in the circumferential direction of the fuel control valve. Alternatively, the width of the first opening can be set to decrease continuously or stepwise in the circumferential direction of the fuel control valve. In this case, when the fuel control valve is rotated in the circumferential direction, properties of a change of a fuel passage area can be variously changed. The fuel control valve can include, for example, a closing area which closes the first opening of the fuel control valve as the fuel control valve is rotated in the circumferential direction.

The axial portion of the fuel control valve can include, for example, a first axial portion and a second axial portion having a diameter larger than that of the first axial portion. The second axial portion can be continuously provided to the first axial portion coaxially. The first opening can be provided at the second axial portion. A circumferential length of the second axial portion longer than that of the first axial portion is advantageous for ensuring a length of the first opening, and increasing fuel controllability.

According to the embodiment, the fuel control valve can be switched between a first mode and a second mode in which the communicating area of the first opening with the fuel passage is larger than the communicating area of the first opening of the fuel control valve with the fuel passage in the first mode. The rotation of the fuel control valve in the circumferential direction relatively to the axial hole can switch the fuel control valve between the first and second modes.

According to the embodiment, the fuel control valve can be switched between a fuel lean mode and a fuel rich mode in which the communicating area of the first opening with the fuel passage is larger than the communicating area of the first opening with the fuel passage in the fuel lean mode. The rotation of the fuel control valve in the circumferential direction relatively to the axial hole can switch the fuel control valve between the fuel lean mode and the fuel rich mode. In the meantime, the fuel rich mode can include a mode of a stoichiometric amount of air.

According to the embodiment, the fuel passage can include a first fuel passage and a second fuel passage. The first opening of the fuel control valve can face either one of the first fuel passage and the second fuel passage. In this case, as the fuel control valve is rotated in the circumferential direction, the communicating area of the first opening of the fuel control valve with said one of the fuel passages can be changed. In this case, a passage area of either one of the first fuel passage and the second fuel passage can be controlled, a passage area of the other of either one of the first fuel passage and the second fuel passage is not controlled by the fuel control valve and is fixed, and a fixed value of the passage area and a variable value of the passage area can be combined.

According to the embodiment, the mixer can further include a second valve apparatus having a flow rate control valve (second valve) for changing a flow rate of mixed gas generated in the mixing space flowing to the engine and a second drive portion for driving the flow rate control valve. In this case, parts of the second drive portion of the second valve apparatus can be common to those of the first drive portion for driving the fuel control valve. It is advantageous for reducing kinds of parts. As a fuel of an engine, gas fuel such as city gas and propane gas is generally utilized.

According to the embodiment of the present invention, the fuel control valve can further include, for example, a second opening. The closing area for closing the fuel control valve can be provided between the first and second openings. In this case, when the fuel control valve is rotated in a first direction of the circumferential direction, the first opening faces the fuel passage. When the fuel control valve is rotated in a second direction of the circumferential direction, the second opening faces the fuel passage. In this case, because rotations of the fuel control valve in the first direction and the second direction can be utilized, versatility can be increased.

A second embodiment of the present invention will be explained. According to the second embodiment, an air conditioning apparatus driven by an engine includes an engine driven with use of a fuel, the mixer for mixing the fuel and air supplied to the engine according to the first embodiment, a compressor driven by the engine, a cooling medium circulation passage in which a cooling medium compressed in the compressor flows, and a heat exchanger provided in the cooling medium circulation passage for heating or cooling.

A third embodiment of the present invention will be explained. According to the third embodiment, a power generation apparatus driven by an engine includes an engine driven with use of a fuel, the mixer for mixing the fuel and air supplied to the engine according to the first embodiment, and a power generator driven by the engine.

According to the embodiments described above, a mixer for an engine, an air conditioning apparatus driven by an engine, and a power generation apparatus driven by an engine can be obtained which are advantageous in downsizing and have increased fuel controllability, and which can ensure fuel controllability even when a degree of opening of a valve is small.

An example according to the first embodiment of the present invention will be explained with reference to FIGS. 1-9. A mixer 2X in the example mixes a gaseous fuel (for example, propane, city gas) and air supplied to a gas engine serving as an engine. The mixer 2X includes a base portion 2 made of metal, ceramics, or a hard resin, a fuel control valve (first valve) 4 provided at the base portion 2, and a first drive portion 7 provided at the base portion 2. The fuel control valve 4 and the first drive portion 7 configure a first valve apparatus. The base portion 2 includes an intake passage 21 in which air flows, a fuel passage 22 in which a fuel flows, a mixing space 27 in which the fuel supplied from the fuel passage 22 and the air supplied from the intake passage 21 are mixed, and an axial hole 28 of a cylindrical shape. A transverse cross-section of the axial hole 28 has a circular shape. The mixing space 27 of the base portion 2 is configured from a venturi portion 3 having an inner diameter smaller than an inner diameter DW of the intake passage 21. The air in the intake passage 21 flows toward a gas engine 11 in a direction illustrated by an arrow Y1 because of negative pressure in the gas engine 11.

The fuel passage 22 includes a main fuel passage 23, a first fuel passage 24 and a second fuel passage 25 branched from the main fuel passage 23. The fuel flowing in the first fuel passage 24 and the fuel flowing in the second fuel passage 25 merges at a merging passage 26. The merging passage 26 is formed in a direction in which the merging passage 26 crosses the intake passage 21. The first passage 24 includes an aperture 29 having a constant passage area. The aperture 29 ensures a base amount of fuel.

Figure 2:
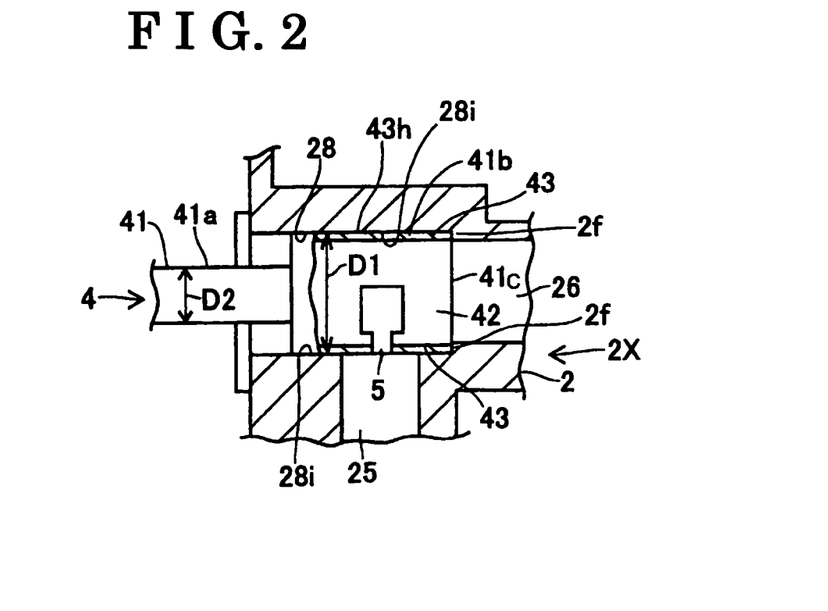
FIG. 2 represents an enlarged cross-sectional view illustrating a main part of the mixer.

The fuel control valve 4 includes an axial portion 41 which is fitted in the axial hole 28 of the base portion 2 and which is rotatable about an axis center P1 in a circumferential direction. As illustrated in FIG. 2, the axial portion 41 includes a first axial portion 41a and a second axial portion 41b coaxial with the first axial portion 41a. An outer diameter D1 of the second axial portion 41b is set larger than an outer diameter D2 of the first axial portion 41a. As a result, a circumferential length of a first opening 5 formed at the second axial portion 41b along the circumferential direction can be large, a slide area of the second axial portion 41b can be ensured, and posture of the second axial portion 41b can be stable. The second axial portion 41b engages with an engaging portion 2f of the base portion 2. Accordingly, the second axial portion 41b does not move closer to the merging passage 26 side.

Figure 1:
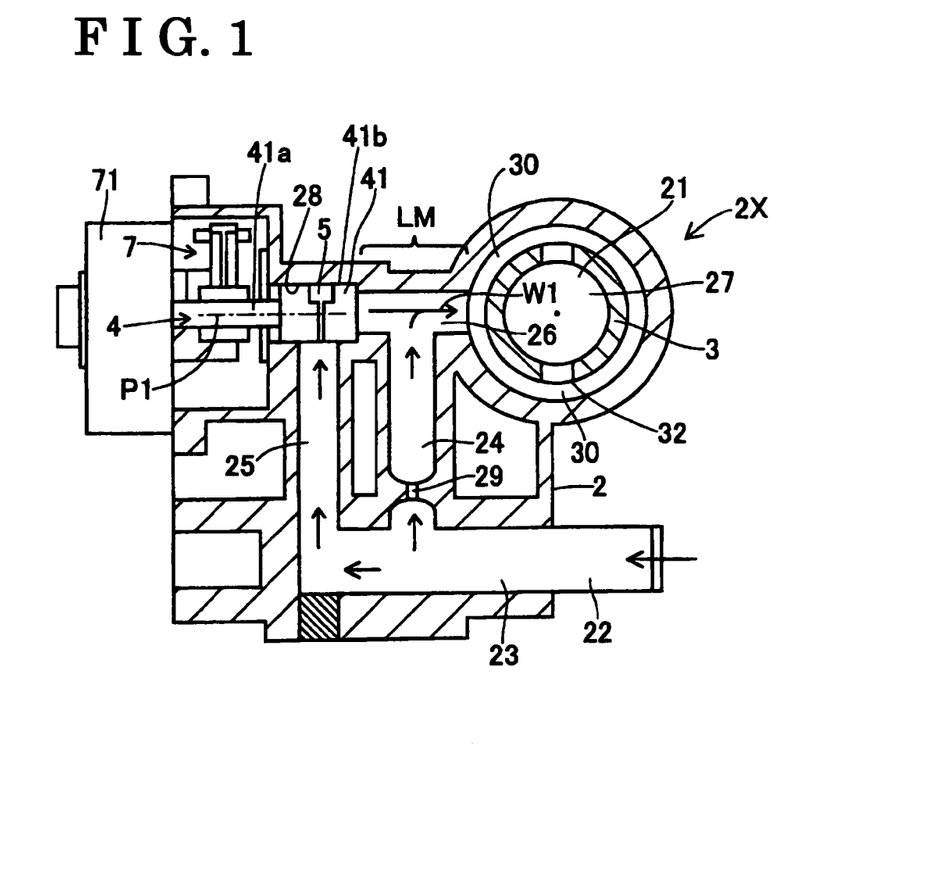
FIG. 1 represents a schematic cross-sectional view illustrating a mixer.

As illustrated in FIG. 2, the second axial portion 41b of the fuel control valve 4 includes a circumferential wall 43 forming a center hole 42 and the first opening 5 penetrating the circumferential wall 43 in a thickness direction and communicating with the center hole 42. An outer circumferential surface 43h of the circumferential wall 43 of the second axial portion 41b has a circular shape in a transverse cross-section. The outer circumferential surface 43h slides along an inner circumferential surface 28i of the axial hole 28. In the meantime, the outer circumferential surface 43h of the circumferential wall 43 of the second axial portion 41b and the inner circumferential surface 28i of the axial hole 28 have abrasion resistance. Accordingly, sealing property between the circumferential wall 43 of the axial portion 41 and the inner circumferential surface 28i of the axial hole 28 can be maintained. Therefore, closing property of the fuel control valve 4 can be ensured. In the meantime, as illustrated in FIG. 1, the first opening 5 of the fuel control valve 4 faces the second fuel passage 25 to control a flow rate in the second fuel passage 25. The valve opening 5 cannot face the first fuel passage 24.

Figure 3:
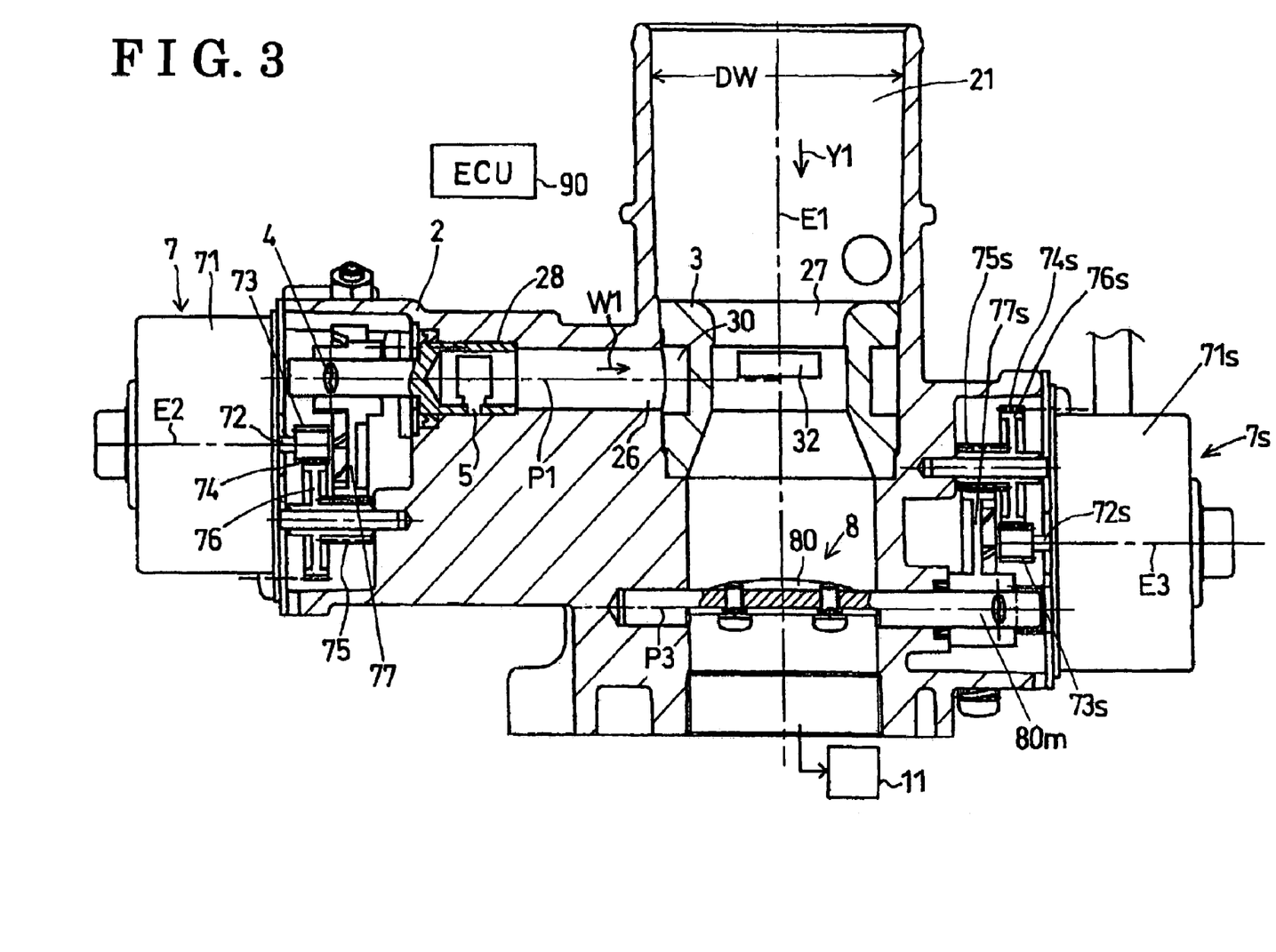
FIG. 3 represents a schematic cross-sectional view illustrating the mixer cut in a different direction.

As illustrated in FIG. 3, the venturi portion 3 includes a ring groove 30 formed at an outer circumferential surface of the venturi portion 3 and a penetrating portion 32 penetrating the outer circumferential surface of the venturi portion 3 in a thickness direction. When air in the intake passage 21 passes the venturi portion 3, flow speed of the air increases and pressure of the air decreases. Accordingly, a gaseous fuel in the second fuel passage 25 can flow into the mixing space 27 of the base portion 2 in a direction illustrated by an arrow W1 through the fuel control valve 4, the ring groove 30 of the venturi portion 3, and the penetrating hole 32 of the venturi portion 3. At the same time, a gaseous fuel in the first fuel passage 24 can flow into the mixing space 27 of the base portion 2 in the direction illustrated by the arrow W1 through the ring groove 30 of the venturi portion 3 and the penetrating hole 32.

The first drive portion 7 rotates the fuel control valve 4 in the circumferential direction thereof relatively to the axial hole 28 of the base portion 2. As the fuel control valve is rotated, a communicating area of the first opening 5 of the fuel control valve 4 with the second fuel passage 25 of the base portion 2 (in other words, a fuel passage area through which the fuel passes) can be changed. The first drive portion 7 includes a first actuator 71 (stepping motor) serving as a first drive source, a first drive gear 73 provided at a first drive shaft 72 of the first actuator 71, a first middle gear 76 having a first large-diameter gear portion 74 engaging with the first drive gear 73, and a first operational gear 77 engaging with a first small-diameter gear portion 75 of the first middle gear 76. When the first actuator 71 is driven according to a command from a control apparatus 90 (Electronic Control Unit "ECU"), operational force is transmitted in a following order: the first drive shaft 72, the first drive gear 73, the first large-diameter gear portion 74 of the first middle gear 76, the first small-diameter gear portion 75 of the first middle gear 76, the first operational gear 77. Thus, the fuel control valve 4 is rotated about the axis center P1 in the circumferential direction.

As illustrated in FIG. 3, a second valve apparatus 8 is provided at downstream the mixing space 27 of the base portion 2. The second valve apparatus 8 includes a throttle valve 80, serving as a flow rate control valve (second valve), for changing a flow rate of a mixed gas of the fuel and the air generated in the mixing space 27 flowing to a combustion chamber of the gas engine 11 and a second drive portion 7s for driving the throttle valve 80. The second drive portion 7s rotates a throttle shaft 80m of the throttle valve 80. As the throttle valve 80 is rotated in a circumferential direction of the throttle shaft 80m, a degree of opening of the throttle valve 80 can be changed. The second drive portion 7s includes a second actuator 71s (stepping motor) serving as a second drive source, a second drive gear 73s provided at a second drive shaft 72s of the second actuator 71s, a second middle gear 76s having a second large-diameter gear portion 74s engaging with the second drive gear 73s, and a second operational gear 77s engaging with a second small-diameter gear portion 75s of the second middle gear 76s. When the second actuator 71s is driven according to a command signal from the control apparatus 90, operational force is transmitted in a following order: the second drive shaft 72s, the drive gear 73s, the second large-diameter gear portion 74s of the second middle gear 76s, the second small-diameter gear portion 75s of the second middle gear 76s, the second operational gear 77s, the throttle shaft 80m. Thus, the throttle valve 80 is rotated, and a degree of opening of the throttle valve 80 is controlled.

Main parts of the second drive portion 7s of the second valve apparatus 8 are common to main parts of the first drive portion 7 for the fuel control valve 4. In other words, the first actuator 71 is common to the second actuator 71s, the first drive shaft 72 is common to the second drive shaft 72s, the first drive gear 73 is common to the second drive gear 73s, he first middle gear 76 is common to the second middle gear 76s, and the first operational ear 77 is common to the second operational gear 77s. By doing so, kinds of parts can be reduced. As illustrated in FIG. 3, the first actuator 71 and the second actuator 71s are provided at the intake passage 21 so that the first actuator 71 faces the second actuator 71s across the intake passage 21. Accordingly, downsizing can be expected.

In the meantime, when the throttle valve 80 is operated, a rotation angle of the throttle valve 80 becomes θs (equal to or less than 90°), and the degree of opening of the fuel control valve 4 is adjusted to a rotation angle θf, the rotation angle θf of the fuel control valve 4 is set larger than the rotation angle θs of the throttle valve 80 (θf>θs).

In the meantime, in FIG. 3, E1 represents an axis center of the intake passage 21, E2 represents an axis center of the first drive shaft 72 of the first actuator 71, E3 represents an axis center of the second drive shaft 72s of the second actuator 71s, and P3 represents an axis center of the throttle shaft 80m. The axis center E2 is substantially parallel to the axis center E3. In the meantime, the axis center P1 of the fuel control valve 4 is substantially parallel to the axis center P3 of the throttle valve 80.

According to the example, a shape of the first opening 5 can be exampled as illustrated in FIGS. 4-9 (indicated by hatching). In other words, FIGS. 4-9 represent development views illustrating expanded shapes of the first opening 5 (and second opening 6 in FIG. 9) formed at the outer circumferential surface of the fuel control valve 4 according to the example. When the fuel control valve 4 is rotated in a direction illustrated by an arrow S1 (a first direction of the circumferential direction), the fuel control valve 4 is opened. When the fuel control valve 4 is rotated in a direction illustrated by an arrow S2 (a second direction of the circumferential direction), the fuel control valve 4 is closed. The fuel control valve 4 includes a closing area 4r for retaining a closed state of the fuel control valve 4. The closing area 4r sets a communicating area of the first opening 5 (and second opening 6) with the second fuel passage 25 (in other words, a degree of opening of the fuel control valve 4) to 0.

Figure 4:
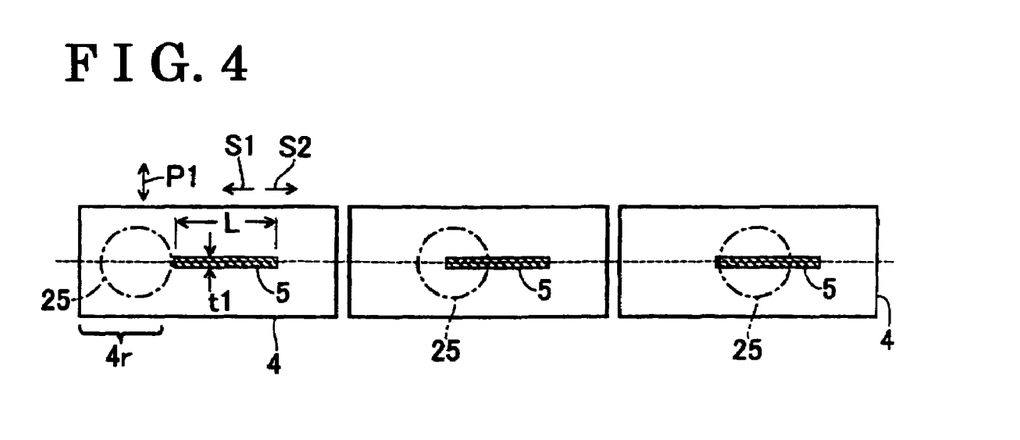
FIG. 4 represents a development view illustrating a relation between a first opening of a fuel control valve and a second fuel passage according to an example.

According to FIG. 4, a width t1 of the first opening 5 of the fuel control valve 4 is set so that the first opening 5 has a linear slit shape in a circumferential direction of the fuel control valve 4 (corresponding to directions illustrated by arrows S1 and S2). An increase (rate of change) of the width t1 of the first opening 5 of the fuel control valve 4 from a minimum width of the first opening 5 is set equal to or less than 10% in the circumferential direction of the fuel control valve 4. A length of the first opening 5 is represented by L. In this case, because the width t1 of the first opening 5 is not changed largely over an entire length of the first opening 5, the amount of fuel can be gradually increased as the fuel control valve 4 is rotated in the circumferential direction.

Figure 5:
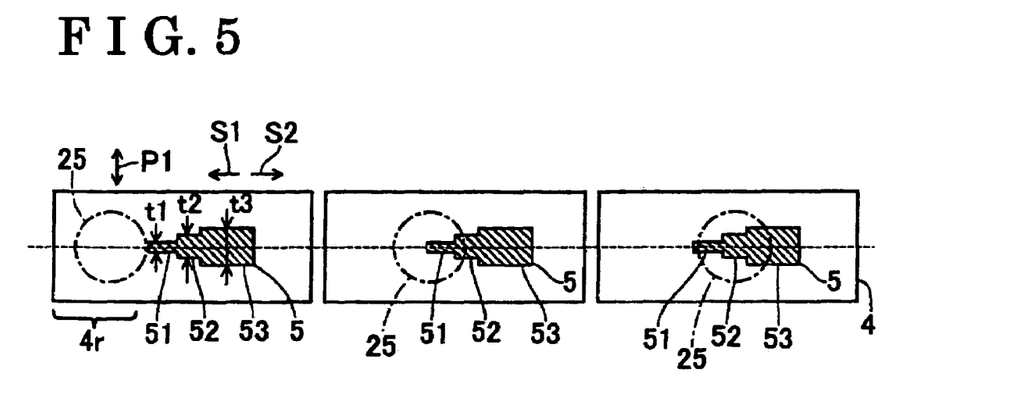
FIG. 5 represents a development view illustrating a relation between a first opening of a fuel control valve and a second fuel passage according to a further example.

According to FIG. 5, the first opening 5 of the fuel control valve 4 includes a first opening portion 51 having a slit width t1 (narrow), a second opening portion 52 having a slit width t2 (middle) wider than the slit width t1, and a third opening portion 53 having a slit width t3 (wide) wider than the slit width t2. Accordingly, as illustrated in FIG. 5, the width of the first opening 5 is set so as to change stepwise in the circumferential direction of the fuel control valve 4 (directions represented by arrows S1, S2). The slit widths t1, t2, and t3 are taken along an axial direction (direction of an arrow P1). Thus, the circumferential direction of the fuel control valve 4 (directions of arrows S1, S2) and the axial direction (direction of the arrow P1) can be utilized so that an opening area of the first opening 5 can be obtained.

Figure 6:
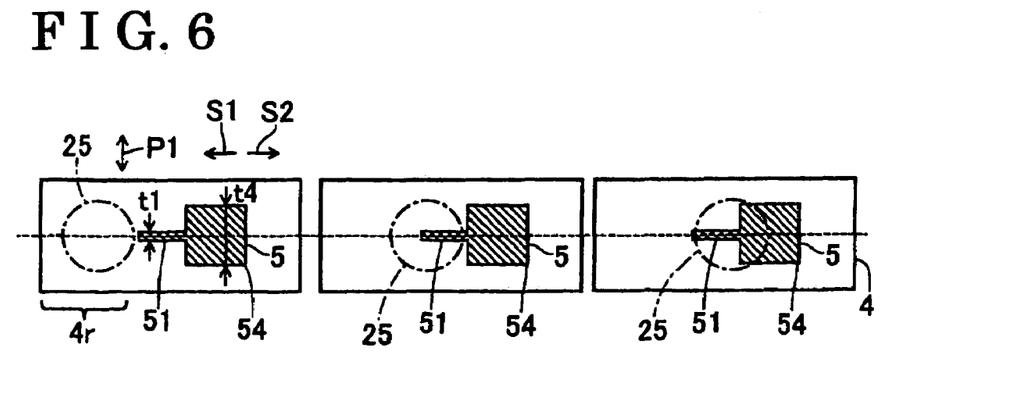
FIG. 6 represents a development view illustrating a relation between a first opening of a fuel control valve and a second fuel passage according to a still further example.
Figure 7A:
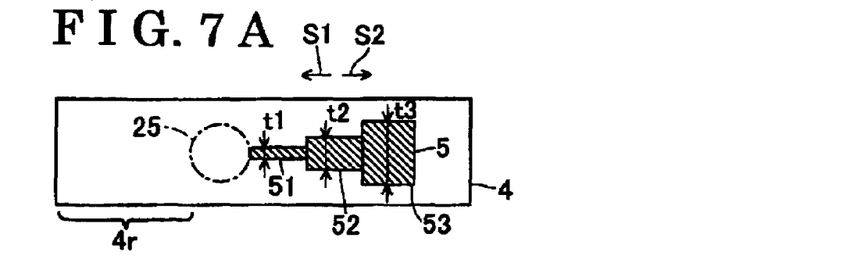
FIGS. 7A-7D represent development views illustrating a relation between a first opening of a fuel control valve and a second fuel passage according to a still further example
Figure 7B:
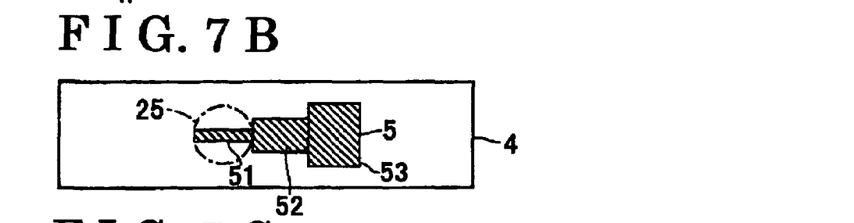
Figure 7C:
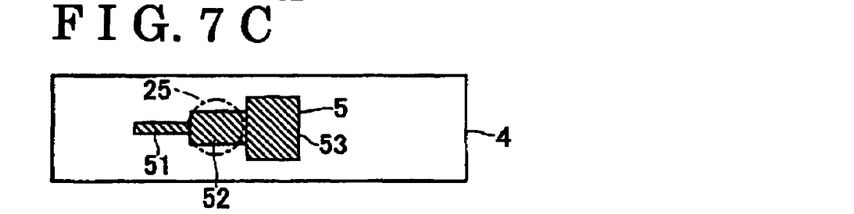
Figure 7D:
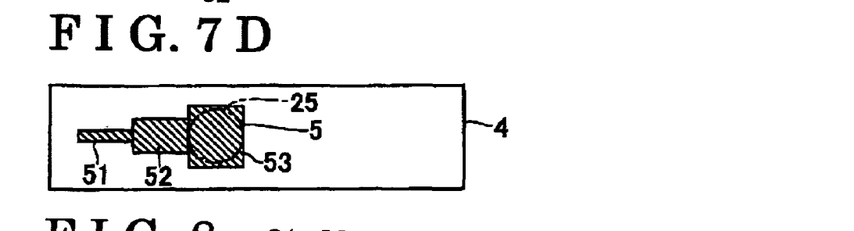

According to FIG. 6, the first opening 5 of the fuel control valve 4 includes a first opening portion 51 having a slit width t1 and a second valve opening portion 54 having a slit width 4 wider than the first slit width t1. Accordingly, as illustrated in FIG. 6, the width of the first opening 5 is set to change stepwise in the circumferential direction of the fuel control valve 4 (directions of arrows S1, S2). In this case, because the width of the first opening 5 changes from the slit width t1 to the slit width t4 drastically, the amount of fuel can be increased drastically as the fuel control valve 4 is rotated in the circumferential direction.

Further, according to FIGS. 7A, 7B, 7C, and 7D, the first opening 5 of the fuel control valve 4 includes a first opening portion 51 having a slit width t1 (narrow), a second opening portion 52 having a slit width t2 (middle) wider than the slit width t1, and a third opening portion 53 having a slit width t3 (wide) wider than the slit width 2. Accordingly, as illustrated in FIGS. 7A-7D, the width of the first opening 5 is set to change stepwise in the circumferential direction (directions of arrows S1, S2) of the fuel control valve 4. In this case, in FIG. 7A, the second fuel passage 25 does not communicate with the first opening 5 of the fuel control valve 4, and the fuel control valve 4 is closed. Further, in FIG. 7B, the second fuel passage 25 communicate with the first opening portion 51 of the fuel control valve 4, and a degree of opening of the fuel control valve 4 corresponds to an opening area of the first opening portion 51. Further, in FIG. 7C, the second fuel passage 25 communicates with the second opening portion 52 of the fuel control valve 4, and a degree of opening of the fuel control valve 4 approximately corresponds to an opening area of the second opening portion 52. Further, in FIG. 7D, the second fuel passage 25 communicates with the third opening portion 53 of the fuel control valve 4, and a degree of opening of the fuel control valve 4 corresponds to an opening area of the second fuel passage 25.

Figure 8:
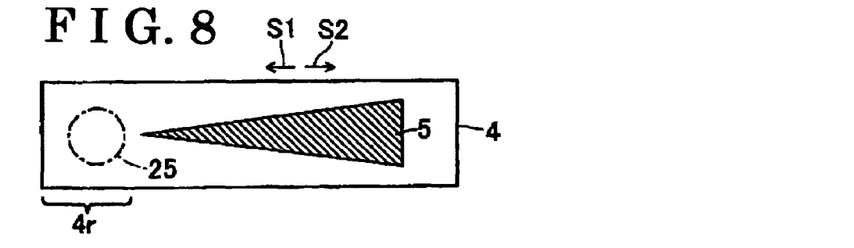
FIG. 8 represents a development view illustrating a relation between a first opening of a fuel control valve and a second fuel passage according to a still further example.

According to FIG. 8, a width of the first opening 5 of the fuel control valve 4 continuously increases in the second direction of the circumferential direction (direction of an arrow S2). Accordingly, a communicating area of the first opening 5 of the fuel control valve 4 with the second fuel passage 25 continuously increases.

Figure 9:
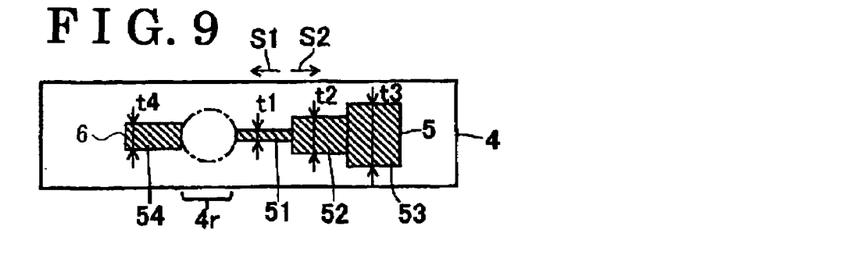
FIG. 9 represents a development view illustrating a relation between first and second openings of a fuel control valve and a second fuel passage according to a still further example.

According to FIG. 9, the first opening 5 of the fuel control valve 4 includes a first opening portion 51 having a slit width t1 (narrow), a second opening portion 52 having a slit width t2 (middle) wider than the slit width t1, and a third opening portion 53 having a slit width t3 (wide) wider than the slit width t2. The fuel control valve 4 further includes a second opening 6 including a fourth opening portion 54. A slit width t4 of the fourth opening portion 54 is set to be different from the slit width t1 of the first opening portion 51, the slit width t2 of the second opening portion 52, and the slit width t3 of the third opening portion 53. Accordingly, as illustrated in FIG. 9, a width of the first and second openings 5, 6 is set to change stepwise in the circumferential direction (directions of arrows S1, S2) of the fuel control valve 4. In this case, as can be seen in FIG. 9, when the first opening portion 51, the second opening portion 52, and/or the third opening portion 53 are/is utilized, the fuel control valve 4 is rotated from the closing area 4r in the direction of the arrow S1. On the other hand, when the fourth opening portion 54 is utilized, the fuel control valve 4 is rotated from the closing area 4r in the direction of the arrow S2, in other words, in an opposite direction.

Figure 10:
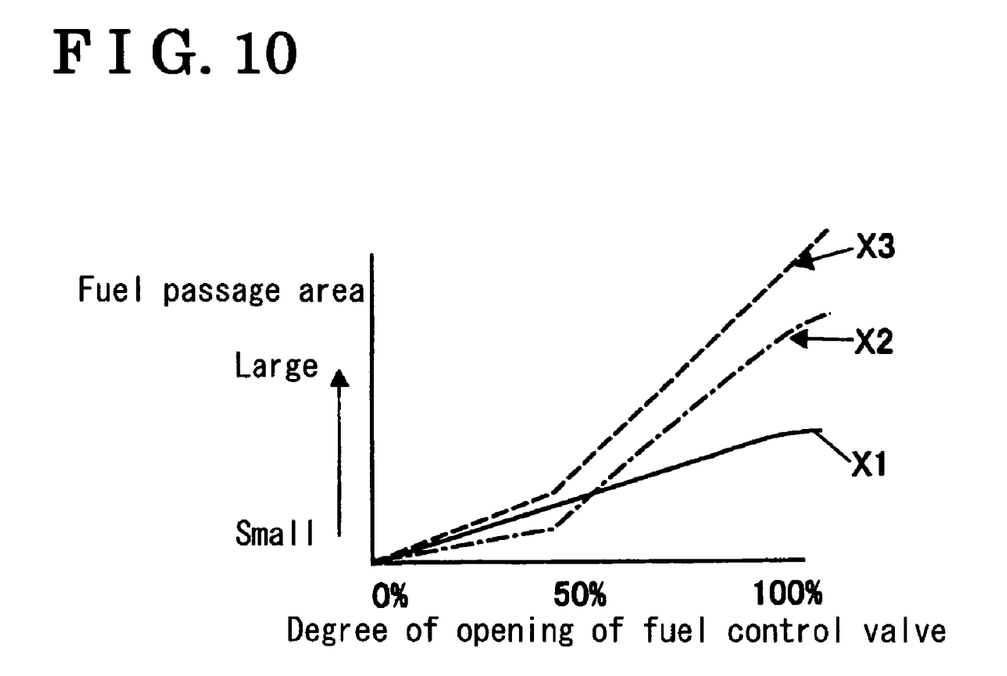
FIG. 10 represents a graph illustrating a relation between a degree of opening of the fuel control valve and an area of a fuel passage.

FIG. 10 represents a pattern diagram illustrating a graph showing a relation of a fuel passage area to the degree of opening of the fuel control valve 4 (the amount of rotation of the fuel control valve 4 in the circumferential direction). The fuel passage area means the communicating area of the opening(s) (first opening 5, second opening 6) of the fuel control valve 4 with the second fuel passage 25. The first fuel passage 24 is not considered. A characteristic line X1 indicates a case of the first opening 5 illustrated in FIG. 4. In this case, the fuel passage area proportionally increases as the amount of rotation of the fuel control valve 4 in the circumferential direction increases, and saturates in a certain area. A characteristic line X2 indicates a case of the first opening 5 illustrated in FIG. 5. A characteristic line X3 indicates a case of the first opening 5 illustrated in FIG. 6. Thus, various shapes of the opening(s) (first opening 5, second opening 6) enable various properties of fuel flow rate adjustment.

As explained above, according to the example, the fuel control valve 4 includes the axial portion 41 fitted in the axial hole 28 of the base portion 2 rotatably in the circumferential direction and the opening(s) (first opening 5, second opening 6) which is provided at the axial portion 41 so as to extend along the circumferential direction and which can face the second fuel passage 25. Accordingly, when the fuel control valve 4 is rotated in the circumferential direction thereof about the axis center P1 relatively to the axial hole 28 by the first drive portion 7, as the fuel control valve 4 is rotated in the circumferential direction, the communicating area of the opening(s) (first openings 5, second opening 6) of the fuel control valve 4 with the fuel passage 22 can be changed, and a degree of opening of the fuel control valve 4 can be adjusted.

Further, according to the example, as described above, the fuel control valve 4 is rotated in the circumferential direction relatively to the axial hole 28. Accordingly, for increasing fuel controllability, a length of the opening(s) (first opening 5, second opening 6) of the fuel control valve 4 along the circumferential direction of the axial portion 41 of the fuel control valve 4 can be increased. In this case, a circumferential length L can be given by D1×3.14, where D1 is a diameter of the second axial portion 41b of the fuel control valve 4, and L is a circumferential length L of the second axial portion 41b of the fuel control valve 4. Therefore, according to this configuration in which the fuel control valve 4 is rotated in the circumferential direction relatively, the mixer 2X can be downsized in the axis length direction of the fuel control valve 4. Further, this configuration is advantageous for increasing the length L of the opening (s) (first opening 5, second opening 6). As a result, downsizing and fuel controllability of the mixer 2X can be expected.

According to the example, the axial portion 41 of the fuel control valve 4 includes, as described above, the first axial portion 41a and the second axial portion 41b which has a diameter larger than that of the first axial portion 41a and which is coaxial with the first axial portion 41a. Then, the opening(s) (first opening 5, second opening 6) is formed at the second axial portion 41b. A circumferential length of the second axial portion 41b longer than that of the first axial portion 41a is advantageous for ensuring a length of the opening(s) (first opening 5, second opening 6). Accordingly, even when the degree of opening of the fuel control valve 4 is small, this example is advantageous in fine adjustment of the fuel by the fuel control valve 4, and can increase fuel controllability.

Further, because the fuel control valve 4 includes the closing area 4r, the fuel control valve 4 can close the second fuel passage 25. Further, because the second axial portion 41b of the fuel control valve 4 is fitted in the axial hole 28, even when the gas engine 11 vibrates largely, shakiness, damage of the second axial portion 41b can be inhibited.

According to the example, as illustrated in FIG. 1, the first fuel passage 24 is formed between the mixing space 27 connected to the intake passage 21 and the fuel control valve 4. Accordingly, a distance LM can be ensured between the mixing space 27 and an end surface 41c of the axial portion 41 of the fuel control valve 4. Therefore, even when force of suction from the mixing space 27 is large, influence in operation of the fuel control valve 4 can be inhibited. Further, because the second fuel passage 25 is provided at the base portion 2 outside the first fuel passage 24, easiness of installing work of the first actuator 71 can be ensured.

Further, according to the example, because the opening area of the aperture 29 of the first fuel passage 24 is constant, even when a degree of opening of the fuel control valve 4 is 0, a fuel can be supplied through the first fuel passage 24.

In the meantime, a conventional throttle valve 80 is a rotation type. However, a conventional fuel control valve (illustrated in FIG. 15) is not a rotation type, but a direct acting type. Accordingly, conventionally, parts of driving systems for the throttle valve 80 and for the conventional fuel control valve cannot be common. In terms of this, according to the example, the fuel control valve 4 is a rotation type, and the amount of rotation and torque of the fuel control valve 4 is not so much different from those of the throttle valve 80. Accordingly, as described above, parts of driving systems for the throttle valve 80 and for the fuel control valve 4 can be common, and kinds of parts can be reduced.

Figure 11:
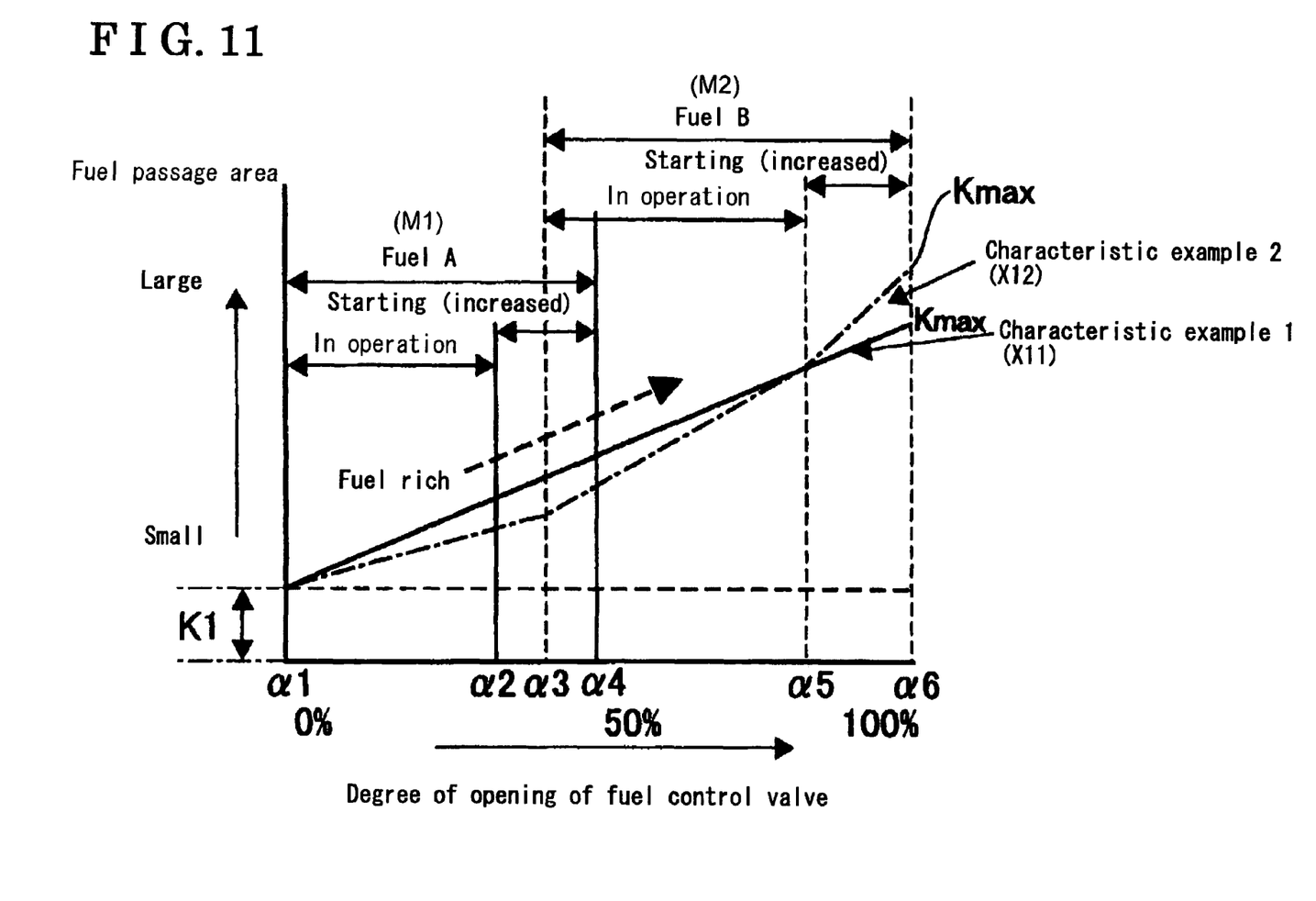
FIG. 11 represents a characteristic diagram illustrating an example for switching different kinds of fuel having different calorific value.

FIG. 11 represents a diagram illustrating an example of usage of the fuel control valve 4 controlled by the control apparatus 90. In FIG. 11, a horizontal axis indicates a degree of opening of the fuel control valve 4 (corresponding to the amount of rotation of the fuel control valve 4 in the circumferential direction), and a vertical axis indicates a fuel passage area through which a fuel flows. In FIG. 11, a characteristic line X11 (characteristic example 1) and a characteristic line X12 (characteristic example 2) obtained from rotation of two kinds of the fuel control valve 4 are illustrated. According to the characteristic line X11 and the characteristic line X12, as the degree of opening of the fuel control valve 4 increases, the fuel passage area increases. In FIG. 11, a passage area K1 is set by a constant passage area of the aperture 29 of the first fuel passage 24. Accordingly, a fuel passage area illustrated in FIG. 11 is based on a sum of the passage area K1 of the aperture 29 of the first fuel passage 24 and the passage area of the second fuel passage 25. As illustrated in FIG. 11, the passage area of the second fuel passage 25 changes between 0 to a maximum passage area Kmax. The maximum passage area Kmax is set larger than the passage area K1 of the aperture 29 of the first fuel passage 24.

Further, according to the example, the mixer 2X is applicable to plural gaseous fuels having different calorific value per unit volume. Generally, a calorific value of propane gas per unit volume is higher than that of city gas per unit volume (for example, approximately 1.3-2.3 times). Therefore, as illustrated in FIG. 11, when a fuel A having higher calorific value per unit volume is utilized, the fuel control valve 4 is set to a first mode M1 (fuel A range) in which the communicating area of the opening(s) (first opening 5, second opening 6) of the fuel control valve 4 with the second fuel passage 25 is smaller. In other words, the degree of opening of the fuel control valve 4 is set within a range from α1 to α4. In the first mode M1 (fuel A range), when the gas engine 11 is started, for increasing a concentration of a fuel and enhancing a startup property, the control apparatus 90 sets the degree of opening of the fuel control valve 4 within a range from α2 to α4. Then, when the engine is in a normal operation, the control apparatus 90 sets the degree of opening of the fuel control valve 4 within a range from α1 to α2.

On the other hand, when a fuel B having lower calorific value per unit volume is utilized, the fuel control valve 4 is set to a second mode M2 (fuel B range) in which the communicating area of the opening(s) (first opening 5, second opening 6) of the fuel control valve 4 with the second fuel passage 25 is larger. The control apparatus 90 sets the degree of opening of the fuel control valve 4 within a range from α3 to α6. Thus, smaller calorific value of the fuel is compensated by increase of the fuel. In the second mode M2 (fuel B range), when the gas engine 11 is started, for increasing a concentration of the fuel and enhancing startup property, the control apparatus 90 sets the degree of opening of the fuel control valve 4 within a range from α5 to α6. Then, when the engine is in a normal operation, the control apparatus 90 sets the degree of opening of the fuel control valve 4 within a range from α3 to α5.

At the time of normal operation, the control apparatus 90 obtains items of information of a degree of opening of the throttle valve 80, a rotational frequency of an engine per unit time, a manifold air pressure of the engine, a temperature of a cooling water for the engine, and a status of a load at an output shaft side of the engine. Then, the control apparatus 90 calculates an optimum degree of opening of the fuel control valve 4, and sets the degree of opening of the fuel control valve 4 to the optimum degree of opening utilizing A/F (air/fuel) feedback control.

Figure 12:
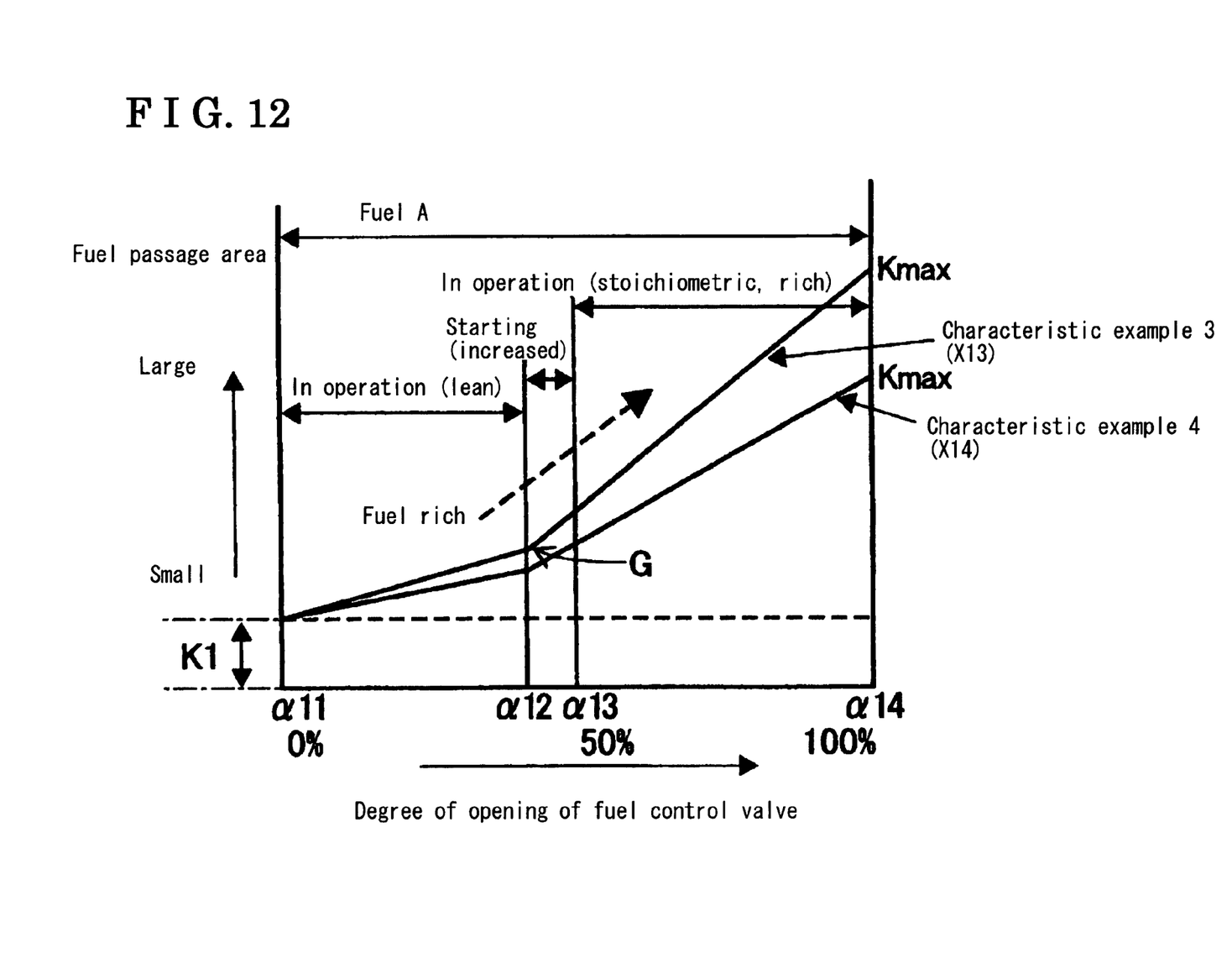
FIG. 12 represents a characteristic diagram illustrating an example for switching between a fuel lean mode and a fuel rich mode.

FIG. 12 represents another example for utilizing the fuel control apparatus 4. A horizontal axis in FIG. 12 indicates a degree of opening of the fuel control valve 4, and a vertical axis in FIG. 12 indicates a fuel passage area. In FIG. 12, a characteristic line X13 (characteristic example 3) and a characteristic line X14 (characteristic example 4) obtained from rotation of two kinds of the fuel control valve 4 are illustrated. According to the characteristic line X13 and the characteristic line X14, as the degree of opening of the fuel control valve 4 increases, the characteristic lines X13 and X14 indicate increase of the fuel passage area. At this time, the characteristic lines X13 and X14 show a bended area G. In FIG. 12, a passage area K1 is set by a constant passage area of the aperture 29 of the first fuel passage 24. As illustrated in FIG. 12, a maximum passage area Kmax of the second fuel passage 25 is set larger than the passage area K1 of the aperture 29 of the first fuel passage 24.

According to the example, even when one kind of fuel (for example, a fuel A) is utilized, a fuel lean mode, in which the amount of fuel is lowered and a concentration of the fuel is lowered, and a fuel rich mode, in which a concentration of the fuel is raised, can be realized. The fuel rich mode includes a mode of stoichiometric amount of air. In the mode of stoichiometric amount of air, a fuel is theoretically completely combusted.

According to FIG. 12, when the gas engine 11 is started, the control apparatus 90 sets a communicating area of the opening(s) (first opening 5, second opening 6) of the fuel control valve 4 with the second fuel passage 25 to a middle range, and sets the degree of opening of the fuel control valve 4 to within a range from α12 to α13. In the fuel lean mode, the control apparatus 90 sets the degree of opening of the fuel control valve 4 within a range from α11 to α12, in other words, an area in which the degree of opening of the fuel control valve 4 is small. Thus, the communicating area of the opening(s) (first opening 5, second opening 6) of the fuel control valve 4 with the second fuel passage 25 becomes smaller. In this case, the control apparatus 90 obtains items of information of the degree of opening of the throttle valve 80, a rotational frequency of the engine per unit time, a manifold air pressure of the engine, a temperature of a cooling water of the engine, and a status of a load at an output shaft side of the engine. Then, the control apparatus 90 calculates an optimum degree of opening of the fuel control valve 4, and sets the degree of opening of the fuel control valve 4 to the optimum degree of opening utilizing an A/F. (air/fuel) feedback control.

Further, in the fuel rich mode, the control apparatus 90 sets the degree of opening of the fuel control valve 4 to within a range from α13 to α14, in other words, an area in which the degree of opening of the fuel control valve 4 is larger. Thus, the communicating area of the opening(s) (first opening 5, second opening 6) of the fuel control valve 4 with the second fuel passage 25 becomes larger. In this case, the control apparatus 90 obtains the degree of opening of the throttle valve 80, a rotational frequency of the engine per unit time, a manifold air pressure of the engine, a temperature of a cooling water of the engine, and a status of a load at the output shaft side of the engine. Then, the control apparatus 90 calculates an optimum degree of opening of the fuel control valve 4, and sets the degree of opening of the fuel control valve 4 to the optimum degree of opening utilizing an A/F (air/fuel) feedback control.

Figure 13:
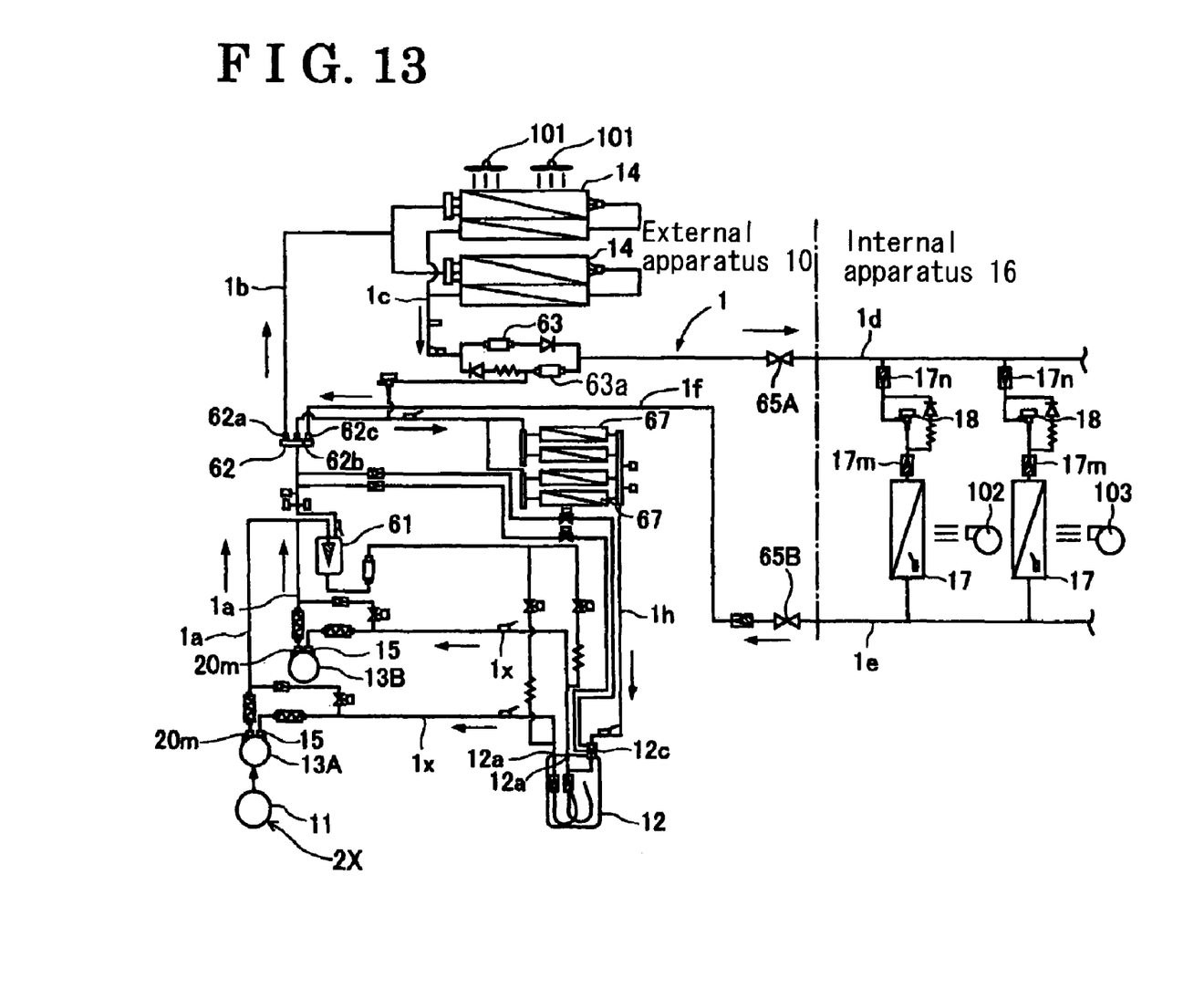
FIG. 13 represents a schematic diagram illustrating an air conditioning apparatus driven by an engine.

Next, application example will be explained with reference to FIG. 13. FIG. 13 represents an application example in which the mixer 2X including the fuel control valve 4 is applied to an air conditioning apparatus driven by an engine. A cooling medium circulation passage 1 of the air conditioning apparatus, illustrated in FIG. 13, will be explained. The cooling medium circulation passage 1 is utilized for cooling or heating inside the room. The cooling medium circulation passage 1 includes an external apparatus 10 and an internal apparatus 16. The outside apparatus 10 basically includes a gas engine 11 serving as an engine, an accumulator 12 for accommodating a cooling medium in a state where the cooling medium is separated into a gaseous state and a liquid state, compressors 13A and 13B driven by the gas engine 11 for sucking and compressing a gaseous cooling medium as the compressors 13A and 13B are driven by the gas engine 11, and an external heat exchanger 14 serving as a heat exchanger for exchanging heat of the cooling medium with outside air for air-conditioning.

The internal apparatus 16 of the cooling medium circulation passage 1 basically includes an internal heat exchanger 17 serving as a heat exchanger of the cooling medium with room air for air-conditioning and an expansion valve 18 for expanding the cooling medium. The gas engine 11 is driven by combustion of a fuel supplied from the mixer 2X.

The compressors 13A and 13B are driven by the gas engine 11 through a transmission member such as a timing belt. Accordingly, the gas engine 11 serves as a drive source of the compressors 13A and 13B. The compressor 13A includes an intake port 15 for sucking the gaseous cooling medium from the accumulator 12 into a compression chamber and an outlet port 20m through which a high pressure cooling medium compressed in the compression chamber flows out. The compressor 13B includes an intake port 15 for sucking a gaseous cooling medium from the accumulator 12 into a compression chamber and an outlet port 20m through which a high pressure gaseous cooling medium compressed in the compression chamber flows out.

Next, a basic path of the cooling medium circulation passage 1 for cooling inside the room will be explained. When the gas engine 11 is driven by a fuel gas, the compressors 13A and 13B are driven, the gaseous cooling medium in the accumulator 12 is sucked from the intake ports 12a through passages 1X, and the gaseous cooling medium is compressed in the compression chambers of the compressors 13A and 13B. The high-temperature and high-pressure compressed gaseous cooling medium flows out through the outlet ports 20m of the compressors 13A and 13B and flows to the passages 1a and an oil separator 61. In the oil separator, oil is separated from the cooling medium.

Then, the cooling medium after the oil is separated flows through a first port 62a of a four-way valve 62 serving as a passage switching valve and a passage 1b, and reaches the outside heat exchanger 14. Then, the high-temperature and high-pressure cooling medium is cooled (heat exchange) in the external heat exchanger 14 and liquefied. The liquefied cooling medium (or cooling medium in which liquefaction proceeded) flows through the passage 1c, a filter drier 63, a ball valve 65A, a passage 1d, and a strainer 17n, and reaches the expansion valve 18. In the expansion valve 18, the cooling medium expands and becomes low temperature.

The cooling medium of low temperature flows through a strainer 17m and reaches the internal heat exchanger 17. In the internal heat exchanger 17, the cooling medium exchanges heat with room air to cool inside the room. Then, the cooling medium flows through a passage 1e, a ball valve 65B, a passage 1f, a third port 62c of the four-way valve 62, the second port 62b of the four-way valve 62, a double pipe heat exchanger 67, and a passage 1h, and flows back to a return port 12c of the accumulator 12. The cooling medium flowing back to the accumulator 12 is accommodated in the accumulator 12 in a state where the cooling medium is separated into a liquid cooling medium and a gaseous cooling medium.

Next, a basic path of the cooling medium circulation passage 1 for heating inside the room will be explained. When the gas engine 11 is driven with use of the fuel gas, the compressors 13A and 13B are driven, a gaseous cooling medium in the accumulator 12 is sucked from the intake port 12a of the accumulator 12 through the passages 1X, and compressed in the compression chambers of the compressors 13A and 13B. The high-temperature and high-pressure compressed cooling medium flows out through the outlet port 20m of the compressors 13A and 13B, flows through the passages 1a, and reaches the oil separator 61. As described above, in the oil separator 61, oil is separated from the cooling medium. Then, the cooling medium after oil is separated flows through a third port 62c of the four-way valve 62, the passage 1f, the ball valve 65B, and the passage 1e, and reaches the internal heat exchanger 17. In the internal heat exchanger 17, the cooling medium exchanges heat with room air (emits heat) to heat inside the room.

Then, the cooling medium flowing from the internal heat exchanger 17 flows through the strainer 17m, and reaches the expansion valve 18. The cooling medium expands in the expansion valve 18. Then, the cooling medium flows through the strainer 17n, the passage 1d, the ball valve 65A, a filter drier 63a, and the passage 1c. Then, the cooling medium reaches the external heat exchanger 14. Then, the cooling medium flows through the first port 62a of the four-way valve 62, the second port 62b, the double pipe heat exchanger 67, and the passage 1h. Then, the cooling medium flows back to the return port 12c of the accumulator 12. The returned cooling medium is accommodated in the accumulator 12 in a state where the cooling medium is separated into a liquid cooling medium and a gaseous cooling medium. In the meantime, a first fan 101 for blowing the external heat exchanger 14, a second fan 102 and a third fan 103 for blowing the internal heat exchanger 17 are provided.

The mixer 2X connected to the gas engine 11 includes the fuel control valve 4. As described above, a configuration is employed for the fuel control valve 4 in which the fuel control valve 4 is relatively rotated in the circumferential direction. Accordingly, the fuel control valve 4 is advantageous for increasing a length of the opening(s) (first opening 5, second opening 6) of the fuel control valve 4 and for downsizing the mixer 2X.

In the air conditioning apparatus driven by an engine, a rotational frequency of the gas engine 11 per unit time is largely changed according to a load of air-conditioning for cooling or heating, or the like. Accordingly, it is preferable that an adjustable range of the amount of a fuel supplied to the gas engine 11 is wide. In terms of this, in the fuel control apparatus 4 according to the example, the mixer can be downsized while a length of the opening(s) (first opening 5, second opening 6) is ensured, and the adjustable range of the amount of the fuel can be wide.

Figure 14:
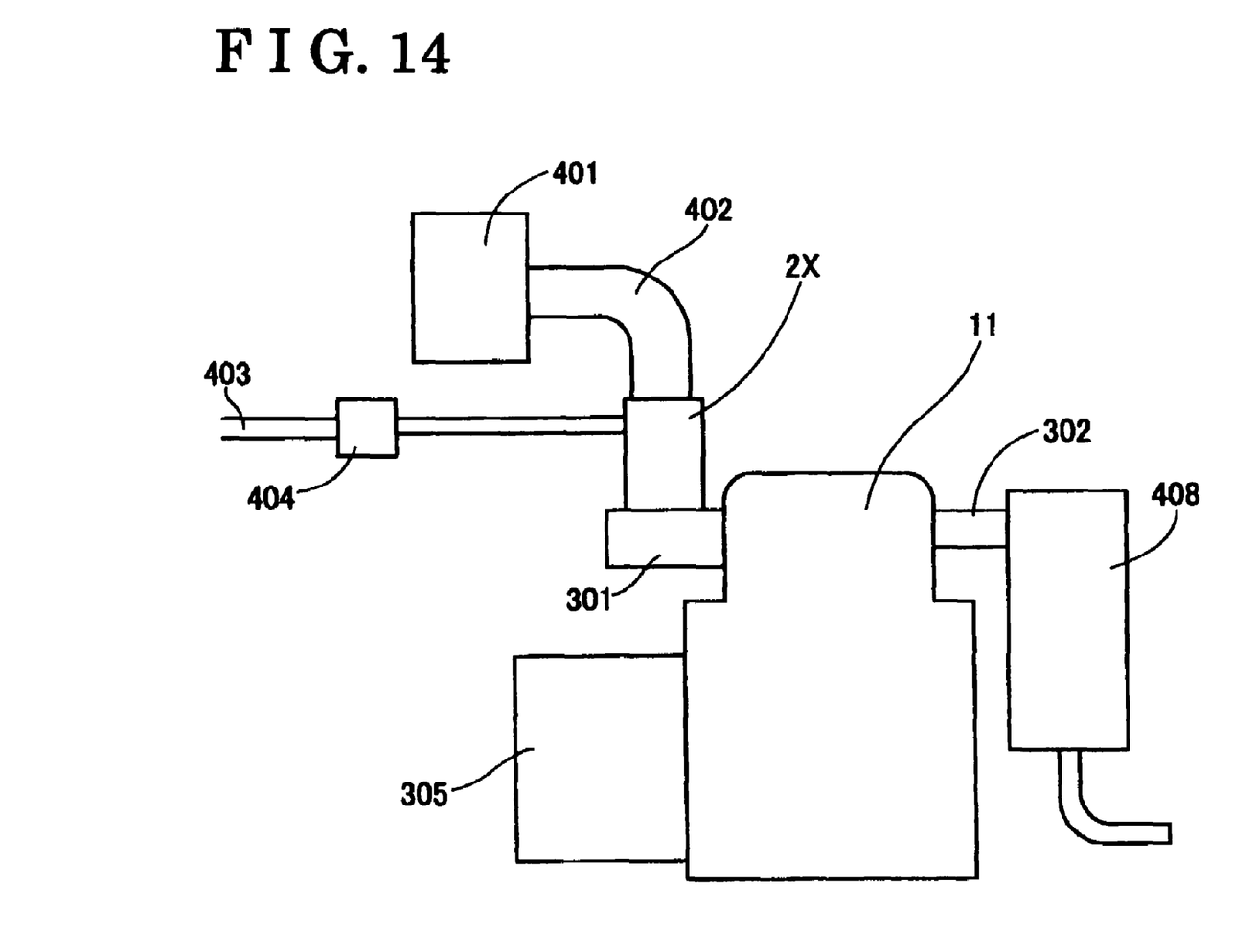
FIG. 14 represents a schematic diagram illustrating a power generation apparatus driven by an engine.

Another application example will be explained. FIG. 14 represents a diagram illustrating another application example in which the fuel control valve 4 is applied to a power generation apparatus driven by an engine. As illustrated in FIG. 14, the power generation apparatus includes a gas engine 11 which includes an intake manifold 301 and an exhaust manifold 302 and which is driven with use of a gaseous fuel (for example, propane, city gas), the mixer 2X for mixing a fuel and air supplied to the intake manifold 301 of the gas engine 11, and a power generation apparatus 305 rotationally driven by a drive shaft of the gas engine 11. Further, when the gas engine 11 is driven and a negative pressure is generated in a combustion chamber of the gas engine 11, air is supplied to the mixer 2X through an air cleaner 401 and an intake pipe 402. In a fuel pipe 403, a fuel regulator 404 is provided. The fuel is supplied to the mixer 2X through the fuel pipe 403 and the fuel regulator 404. An exhaust gas exhausted from the gas engine 11 flows to an exhaust gas heat exchanger 408 through the exhaust manifold 302.

The mixer 2X includes the fuel control valve 4. As described above, a configuration is employed for the fuel control valve 4 in which the fuel control valve 4 is relatively rotated in the circumferential direction thereof. Accordingly, the fuel control valve 4 is advantageous for increasing a length of the opening(s) (first opening 5, second opening 6) of the fuel control valve 4 and for downsizing the mixer 2X.

Next, remarks will be explained. In the example described above, the fuel control valve 4 is provided at the second fuel passage 25. However, it is not limited. The fuel control valve 4 can be provided at the first fuel passage 24. Further, in the example described above, the fuel passage 22 includes the branched first fuel passage 24 and the second fuel passage 25. However, it is not limited. It is possible that the fuel passage 22 is not branched. In the application examples described above, the air conditioning apparatus driven by an engine and the power generation apparatus driven by an engine are exampled. However, it is not limited. The mixer 2X including the fuel control apparatus 4 can be applied to other utility including an engine such as a gas engine. In FIG. 11, the fuel control apparatus 4 is switched between two kinds of fuel, a fuel A having higher calorific value and a fuel B having lower calorific value. However, the fuel control valve 4 can be switched between three or more kinds of fuel.

A fuel control valve according to the embodiment of the present invention can be utilized for a mixer for an engine. Further, a fuel control valve according to the embodiment of the present invention can be utilized for an air conditioning apparatus driven by an engine or a power generation apparatus driven by an engine including a mixer for an engine.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A mixer for an engine for mixing a fuel and air supplied to the engine, comprising:
    a base portion having an intake passage in which the air flows, a fuel passage in which the fuel flows, a mixing space in which the fuel flowing from the fuel passage and the air flowing from the intake passage are mixed, and an axial hole which has a cylindrical shape and communicates with the mixing space;
    a first valve having an axial portion fitted in the axial hole of the base portion and rotatable in a circumferential direction of the axial portion, a center hole which is provided in the axial portion and communicates with the axial hole, and a first opening which is provided at the axial portion and communicates with the center hole, the first opening communicable with the fuel passage; and
    a first drive portion for rotating the first valve in a circumferential direction thereof relative to the axial hole for changing a communicating area of the first opening of the first valve with the fuel passage as the first valve is rotated in the circumferential direction thereof.

2. The mixer for an engine according to claim 1, wherein an increase of a width of the first opening of the first valve from a minimum width of the first opening is set equal to or less than 10% in the circumferential direction of the first valve, and the first opening is provided so as to extend linearly.

3. The mixer for the engine according to claim 1, wherein a width of the first opening of the first valve is set to change continuously or stepwise in the circumferential direction of the first valve.

4. The mixer for the engine according to claim 1, wherein the axial portion of the first valve includes a first axial portion and a second axial portion which is continuously and coaxially provided with the first axial portion and which has a diameter larger than that of the first axial portion, and the first opening is provided at the second axial portion.

5. The mixer for the engine according to claim 1, wherein the mixer can be switched between a first mode and a second mode in which the communicating area of the first opening of the first valve with the fuel passage is larger than the communicating area of the first opening of the first valve with the fuel passage in the first mode, and the mixer is set so that the first mode and the second mode can be switched by rotation of the first valve in the circumferential direction thereof relatively to the axial hole.

6. The mixer for the engine according to claim 1, wherein the mixer can be switched between a fuel lean mode and a fuel rich mode in which the communicating area of the first opening of the first valve with the fuel passage is larger than the communicating area of the first opening of the first valve with the fuel passage in the fuel lean mode, and the mixer is set so that the fuel lean mode and the fuel rich mode can be switched by rotation of the first valve in the circumferential direction thereof relatively to the axial hole.

7. The mixer for the engine according to claim 2, wherein the mixer can be switched between a fuel lean mode and a fuel rich mode in which the communicating area of the first opening of the first valve with the fuel passage is larger than the communicating area of the first opening of the first valve with the fuel passage in the fuel lean mode, and the mixer is set so that the fuel lean mode and the fuel rich mode can be switched by rotation of the first valve in the circumferential direction thereof relatively to the axial hole.

8. The mixer for the engine according to claim 3, wherein the mixer can be switched between a fuel lean mode and a fuel rich mode in which the communicating area of the first opening of the first valve with the fuel passage is larger than the communicating area of the first opening of the first valve with the fuel passage in the fuel lean mode, and the mixer is set so that the fuel lean mode and the fuel rich mode can be switched by rotation of the first valve in the circumferential direction thereof relatively to the axial hole.

9. The mixer for the engine according to claim 1, wherein the fuel passage includes a main fuel passage, first and second fuel passages branched from the main fuel passage, and a merging passage in which the fuel flowing from the first fuel passage merges with the fuel flowing from the second fuel passage and which connects the center hole with the mixing space, the first opening of the first valve can face the first fuel passage, and the second fuel passage is connected with the merging passage.

10. The mixer for the engine according to claim 9, wherein the second fuel passage includes an aperture for narrowing a passage area of the second fuel passage.

11. The mixer for the engine according to claim 10, wherein a maximum passage area of the second fuel passage is set larger than a passage area of the aperture.

12. The mixer for the engine according to claim 2, wherein the fuel passage includes a main fuel passage, first and second fuel passages branched from the main fuel passage, and a merging passage in which the fuel flowing from the first fuel passage merges with the fuel flowing from the second fuel passage and which connects the center hole with the mixing space, the first opening of the first valve can face the first fuel passage, and the second fuel passage is connected with the merging passage.

13. The mixer for the engine according to claim 12, wherein
the second fuel passage includes an aperture for narrowing a passage area of the second fuel passage.

14. The mixer for the engine according to claim 3, wherein the fuel passage includes a main fuel passage, first and second fuel passages branched from the main fuel passage, and a merging passage in which the fuel flowing from the first fuel passage merges with the fuel flowing from the second fuel passage and which connects the center hole with the mixing space, the first opening of the first valve can face the first fuel passage, and the second fuel passage is connected with the merging passage.

15. The mixer for the engine according to claim 14, wherein
the second fuel passage includes an aperture for narrowing a passage area of the second fuel passage.

16. The mixer for the engine according to claim 1, further including a second valve for changing the amount of mixed gas generated in the mixing space of the base portion flowing to the engine and a second drive portion for driving the second valve, wherein
parts of the second drive portion for driving the second valve are common to those of the first drive portion for driving the first valve.

17. The mixer for the engine according to claim 1, wherein
the first valve includes a closing area for closing the fuel passage as the first valve is rotated in the circumferential direction thereof.

18. The mixer for the engine according to claim 17, wherein
the first valve further includes a second opening, the closing area is provided between the first opening and the second opening, the first valve is set so that the first opening faces the fuel passage as the first valve is rotated in a first direction of the circumferential direction thereof and so that the second opening faces the fuel passage as the first valve is rotated in a second direction of the circumferential direction thereof.

19. An air conditioning apparatus driven by an engine, comprising:
an engine driven with use of a fuel;
the mixer for the engine for mixing the fuel and air supplied to the engine according to claim 1;
a compressor driven by the engine;
a cooling medium circulation passage in which a cooling medium compressed in the compressor flows; and
a heat exchanger provided in the cooling medium circulation passage for heating or cooling.

20. A power generation apparatus driven by an engine, comprising:
an engine driven with use of a fuel;
the mixer for the engine for mixing the fuel and air supplied to the engine according to claim 1; and
a power generator driven by the engine.

\* \* \* \* \*